3,323,870
TREATMENT PROCESS FOR SILICON
COMPOUNDS
John Arthur Baldrey and John Charles Alexander Weaver,
Bedford, England; said Baldrey assignor to Texas Instruments Incorporated, Dallas, Tex., a corporation of Delaware
No Drawing. Filed Oct. 11, 1962, Ser. No. 229,976
Claims priority, application Great Britain, Oct. 11, 1961, 36,553/61
9 Claims. (Cl. 23—205)

This invention relates to a process for the treatment of silicon compounds of the group consisting of halogen substituted derivatives of silane. In particular the invention relates to a treatment process for the removal or substantial removal of phosphorous trichloride and/or phosphorous pentachloride which may be present in such compounds.

During preparation of elemental silicon of sufficient purity for the manufacture of semiconductor devices it is of importance that elements of Groups III and V of the periodic table of elements, according to Mendeleef, are, as far as possible, removed. One method for preparation of elemental silicon comprises distilling a volatile liquid compound of silicon and then reducing the resulting gaseous compound with hydrogen in a furnace. Whilst this method is effective in removing some impurities from the gaseous silicon compound it is not completely effective especially as regards compounds of boron and phosphorous.

It has previously been disclosed that phosphorous trichloride and phosphorous pentachloride can be removed from silicon tetrachloride by adsorption on activated alumina. However, we have found that this method is not effective when applied to trichlorosilane, owing to the different physical properties of the silicon tetrachloride and trichlorosilane, the former having a symmetrical and the latter an unsymmetrical, molecular structure.

It is an object of the present invention to provide an improved treatment process for halogen substituted derivatives of silane to remove, or to substantially remove, phosphorous trichloride and/or phosphorous pentachloride which may be present and a treatment process in accordance with the invention includes contacting a halogen substituted derivative of silane, (in particular trichlorosilane or silicon tetrachloride), with an adsorbent substance comprising alumina coated with an amount of platinum tetrachloride in the range of 0.1% to 25% by weight referred to the alumina. The above range of platinum tetrachloride content has been found effective to produce alumina coated with a mono-layer of platinum tetrachloride.

The adsorbent substance is prepared by depositing a required amount of chloroplatinic acid, (the conversion ratio of chloroplatinic acid to platinum tetrachloride being approximately 0.8), on alumina, and subequently converting to platinum tetrachloride by heating in the temperature range 320° C. to 370° C. for a period in excess of 1 hour. Temperatures below the lower limit of this range have been found not to result in an effective conversion of the chloroplatinic acid whilst at temperatures above the higher limit, it has been found that conversion to chlorides of lower orders than tetrachloride may occur. Conveniently, the deposition may be effected by slurrying together alumina and chloroplatinic acid.

It has been found that the adsorbent substance used in a process according to the invention is effective to remove nearly four molecules of phosphorous trichloride for each molecule of adsorbent substance. Thus, the adsorbent substance has a relatively high capacity and rapid rates of reaction also may be achieved.

A process in accordance with the invention may be utilised in the purification of a halogen substituted derivative of silane and particularly of trichlorosilane or silicon tetrachloride. The silane derivative firstly is distilled, removing non-volatile contaminants and some volatile contaminants and also reducing any phosphorous pentachloride to phosphorous trichloride and chlorine. The distilled liquid then is treated in accordance with the invention, yielding a substantially purified liquid silane derivative. This purified liquid may be volatilized and the resultant gaseous compound reduced to yield substantially pure elemental silicon.

The invention utilises the fact that phosphorous trichloride forms a co-ordination compound with platinum tetrachloride of the type $Pt(PCl_3)_xCl_4$. We have found that the adsorbent substance has a relatively high capacity, corresponding to $x=3.8$, and that it is possible to obtain rapid rates of reaction, for example 95% adsorbtion during the first minute of reaction has been recorded.

The platinum tetrachloride content of the adsorbent is not critical within the range quoted and will normally be determined by practical considerations. For treatment of small quantities of silane derivatives, usually a relatively low platinum tetrachloride content is suitable. For treatment of large quantities of silane derivative usually it is more convenient to use a higher platinum tetrachloride content for the adsorbent but instead a larger amount of adsorbent containing a lower amount of platinum tetrachloride also could be used. The particle size of the adsorbent is not critical, the main consideration being that effective contact between the adsorbent and the silane derivative being treated is obtained.

Processes embodying the invention now will be described in greater detail.

The adsorbent substance used in the following examples was prepared in the following manner. Alumina was coated with 10% by weight of platinum tetrachloride by slurrying 80 gms. of alumina with a solution of 10 gms. of chloroplatinic acid and the slurry then was evaporated to dryness. The dried slurry was then baked at a temperature of 370° C. for 1½ hours.

Example 1

A solution of 10 mls. of trichlorosilane containing a small mount of radioactive labelled phosphorous trichloride was prepared. A count of the radioactivity of the solution was taken and found to be 3910 counts/minute. Into this solution was introduced 1 gm. of adsorbent substance, comprising alumina coated with 10% platinum tetrachloride, from the batch prepared as described above.

After 1 minute of contact between the adsorbent and the trichlorosilane solution, the radioactive count of the solution had fallen to 180 counts/minute whilst after 10 minutes the count had reduced to 5.7 counts/minute. The residual radioactive content of the solution after treatment provides a measure of the effectiveness of the treatment process. These figures correspond to an adsorption of phosphorous trichloride of 95.4% during the first minute and 99.8% after ten minutes.

For comparison purposes, another solution of 10 mls. of trichlorosilane containing a small amount of radioactive phosphorous trichloride was prepared and a radioactive count of 4160 counts/minute observed. Into this solution was introduced 1 gm. of activated alumina; after one minute of contact the radioactive count of the solution remained at 4160 counts/minute whilst after 17½ hours the count had fallen to 3370 counts/minute. This latter figure corresponds to an adsorbtion of only 19% of phosphorous trichloride after 17½ hours contact.

Example 2

A solution of 10 mls. of silicon tetrachloride containing a small amount of radioactive labeled phosphorous trichloride was prepared and a measure of the radioactivity of the solution of 2285 counts/minute was observed.

Into the solution was introduced 1 gm. of adsorbent substance, comprising alumina coated with 10% of platinum tetrachloride, and taken from the batch prepared in the manner described previously.

After 10 minutes of contact between the absorbent and the silicon tetrachloride, the radioactive count was observed to be 32 counts/minute corresponding to adsorbtion of 98.6% of the phosphorous trichloride.

Examples 1 and 2 are summarised below:

| Solvent | Adsorbent | Time of Contact | Weight of Adsorbent, gm. | Volume of Solution, mls. | Radioactive Accounts/Minute | | Percent PCl₃ Adsorbed |
|---------|-----------|-----------------|--------------------------|--------------------------|-----------------------------|-------|--------|
| | | | | | Before | After | |
| SiHCl₃ | 10% PtCl₄ on Al₂O₃ | 1 min | 1 | 10 | 3,910 | 180 | 95.4 |
| | | 10 mins | 1 | 10 | 3,910 | 5.7 | 99.8 |
| SiHCl₃ | Activated Al₂O₃ | 15½ mins | 1 | 10 | 4,160 | 4,160 | 0 |
| | | 17½ hours | 1 | 10 | 4,160 | 3,370 | 19 |
| SiCl₄ | 10% PtCl₄ on Al₂O₃ | 10 mins | 1 | 10 | 2,285 | 32 | 98.6 |

*Example 3*

300 mls. of distilled trichlorosilane were placed in a flask and doped with 2.5 μgms. phosphorous per ml. using radioactive labelled phosphorous trichloride.

A stream of nitrogen then was introduced into the flask to force the solution through an adsorbtion column containing 10 gms. of alumina coated with 10% platinum tetrachloride, taken from the batch prepared as described above. After passing through the adsorbtion column the liquid was continuously monitored by a radioactivity meter and then was collected in another flask.

Initially, no radioactivity could be detected in the eluant but, during the process, the radioactivity increased to a final count of 60 counts per minute, corresponding to an average phosphorous concentration of $4 \times 10^{-4}$ μgms./ml. in the treated solvent. Thus, the collection flask contained substantially purified trichlorosilane.

A treatment process in accordance with the invention may be used in the purification of halogen substituted derivatives of silane, in particular for the preparation of elemental silicon suitable for use in manufacture of semiconductor devices. The silane derivative firstly is distilled, the distillation removing non-volatile impurities, as many volatile contaminants as is feasible and serving also to reduce any phosphorous pentachloride to phosphorous trichloride and chlorine. The distilled liquid silane derivative is then treated in accordance with the invention by passing it through an adsorbtion column containing alumina coated with an amount of platinum tetrachloride in the range 0.1% to 25% by weight referred to the alumina. The actual quantity of adsorbent substance is determined in accordance with the principles previously discussed herein. After passage through the adsorbtion column a substantially purified silane derivative results.

The purified silane derivative then is reduced with hydrogen in a furnace, in known manner, yielding substantially pure elemental silicon. This method of purification and production of silicon has been found particularly suitable using trichlorosilane and silicon tetrachloride as starting materials.

We claim:

1. A process for the substantial removal from a halogen substituted derivative of silane of at least one of the compounds selected from the group consisting of phosphorous trichloride and phosphorous pentachloride, which comprises contacting the said silane derivative with an adsorbent substance comprising alumina coated with platinum tetrachloride and having a platinum tetrachloride content in the range 0.1% to 25% by weight referred to the alumina content.

2. A process for the substantial removal from a chlorine substituted derivative of silane of at least one of the compounds selected from the group consisting of phosphorous trichloride and phosphorous pentachloride, which comprises contacting said silane derivative with an adsorbent substance comprising alumina coated with platinum tetrachloride and having a platinum tetachloride content in the range 0.1% to 25% by weight referred to the alumina content.

3. A process according to claim 2, in which said chlorine substituted derivative of silane is trichlorosilane.

4. A process according to claim 2, in which said chlorine substituted derivative of silane is silicon tetrachloride.

5. A process according to claim 2, in which said adsorbent substance is prepared by depositing chloroplatinic acid on alumina and subsequently baking the mixture within the temperature range 320° C. to 370° C. for a period in excess of one hour.

6. A process according to claim 5, in which said chloroplatinic acid and alumina are slurried together, evaporated to dryness and then baked within said temperature range for said period of time.

7. A process according to claim 2, in which said adsorbent substance contains approximately 10% by weight, referred to the alumina, of platinum tetrachloride.

8. A process for the preparation of semiconductor grade silicon, comprising distilling a halogen substituted derivative of silane, treating the distilled silane derivative by passing it through an adsorption column containing alumina coated with platinum tetrachloride in the range 0.1% to 25% by weight of platinum tetrachloride referred to the alumina, volatilizing the treated silane derivative to form a gaseous compound, and reducing the gaseous compound to elemental silicon.

9. A process for the preparation of semiconductor grade silicon, comprising distilling a chlorine substituted derivative of silane, treating the distilled silane derivative by passing it through an adsorption column containing alumina coated with platinum tetrachloride in the range 0.1% to 25% by weight of platinum tetrachloride referred to the alumina, volatilizing the treated silane derivative to form a gaseous compound, and reducing the gaseous compound to elemental silicon.

References Cited

UNITED STATES PATENTS

| | | | |
|---|---|---|---|
| 2,943,918 | 7/1960 | Pauls | 23—14 |
| 2,970,040 | 1/1961 | Conn | 23—205 |
| 3,069,239 | 12/1962 | Winter et al. | 23—205 |
| 3,071,444 | 1/1963 | Theuerer | 23—205 |

MILTON WEISSMAN, *Primary Examiner.*

MAURICE A. BRINDISI, *Examiner.*

E. STERN, *Assistant Examiner.*